ASAHEL G. CRANE.
Improvement in Churns.
No. 127,852.
Patented June 11, 1872.
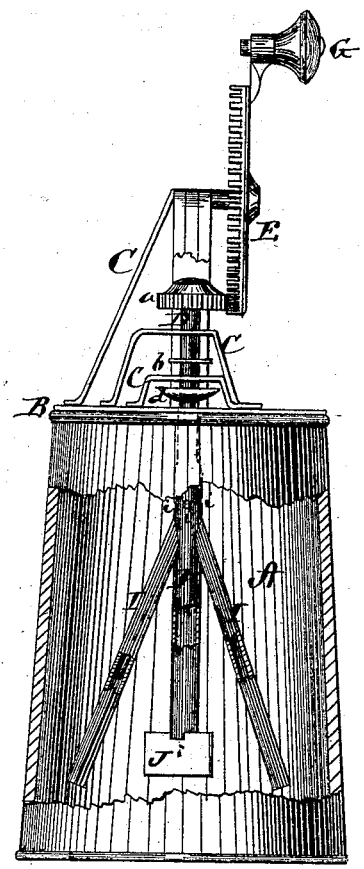

UNITED STATES PATENT OFFICE.

ASAHEL G. CRANE, OF OTTUMWA, IOWA.

IMPROVEMENT IN CHURNS.

Specification forming part of Letters Patent No. 127,852, dated June 11, 1872.

*To all whom it may concern:*

Be it known that I, ASAHEL G. CRANE, of Ottumwa, in the county of Wapello and in the State of Iowa, have invented certain new and useful Improvements in Churns; and do hereby declare that the following is a full, clear, and exact description thereof, reference being had to the accompanying drawing and to the letters of reference marked thereon making a part of this specification.

The nature of my invention consists in the construction and arrangement of a "churn," as will be hereinafter more fully set forth.

In order to enable others skilled in the art to which my invention appertains to make and use the same, I will now proceed to describe its construction and operation, referring to the annexed drawing, which represents a side elevation of my churn, partly in section.

A represents the vessel, made in cylindrical conical form, the bottom being larger than the top. This vessel is closed on top by a cover, B, which carries the entire mechanism of the churn. On top of the cover B are suitable frames or standards C C to form supports or bearings for a vertical shaft, D, which passes down through the center of the cover, and also form bearings for a short shaft contrate cog-wheel, E, provided with a crank, G. This cog-wheel gears with a pinion, a, on the upper end of the shaft D, thus imparting motion to the same when the wheel is revolved. The shaft D is prevented from going down too far by a collar, b, resting upon the lower frame C. On the shaft, immediately above the cover B, is a cup, d, which prevents oil and dust from going into the cream. Below the cover B the shaft D is attached to a vertical tube, H, which forms a continuation of the shaft. This tube is, near its upper end, provided with a series of smaller tubes, I I, diverging from the center, as shown. All these tubes are open at the bottom, and the center tube H is, above the point of connection with the smaller tubes, provided with a series of holes or openings, *i i*. The revolving of the tubes causes the air to rush down through the tubes and rise through the cream, thereby completely aerating the cream. To the lower ends of one or more of the tubes H and I may be attached cutters or paddles J J, if deemed necessary.

Having thus fully described my invention, what I claim as new, and desire to secure by Letters Patent, is—

1. In a churn, a central revolving tube, H, provided with apertures *i i* and a series of diverging tubes, I I, and with or without the cutters or paddles J J, substantially as and for the purposes herein set forth.

2. The within-described churn, consisting of the vessel A, cover B, frame C, shaft D with pinion a, collar b, and cup d, cog-wheel E with crank G, and tubes H and I I, all constructed and arranged substantially as and for the purposes herein set forth.

In testimony that I claim the foregoing I have hereunto set my hand this 20th day of April, 1872.

ASAHEL GEORG CRANE.

Witnesses:
W. H. C. JAYNES,
W. T. JOHNSTON.